United States Patent Office 3,252,229
Patented May 24, 1966

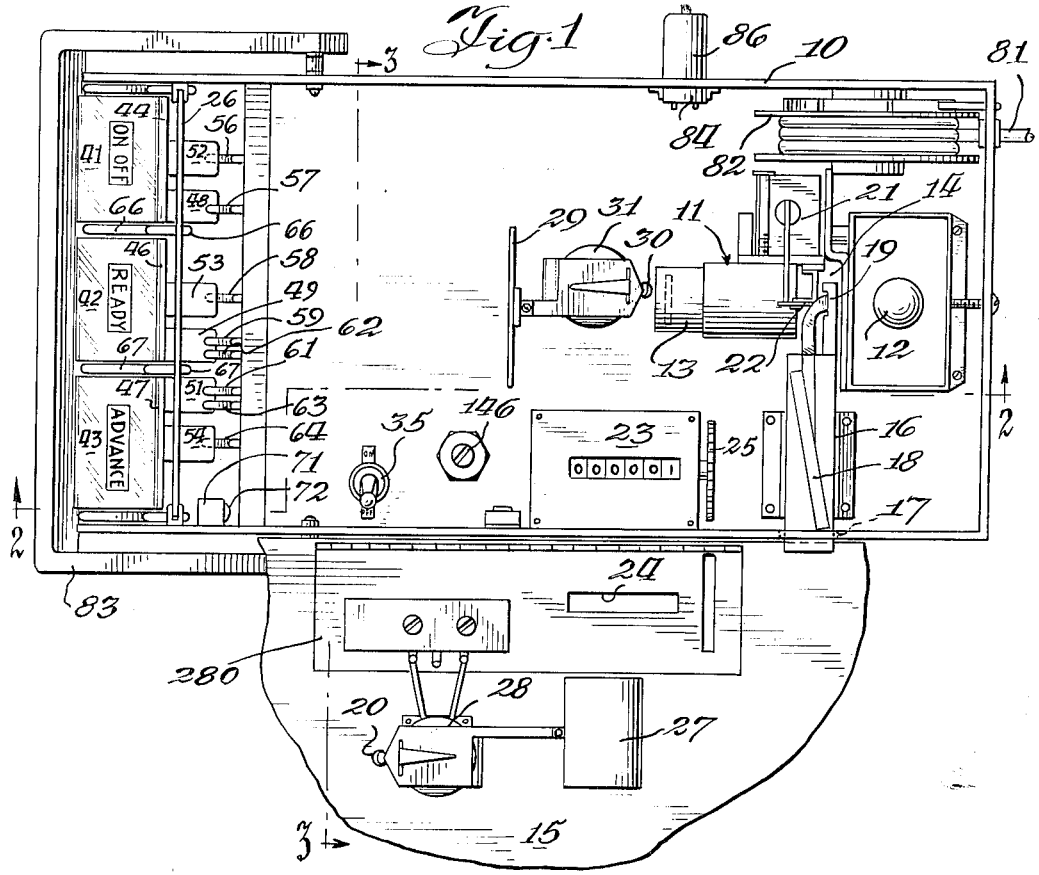
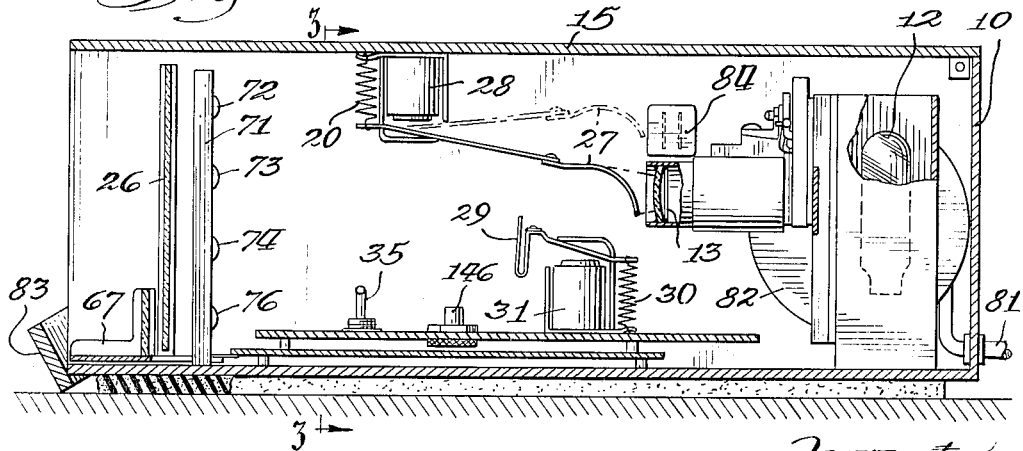

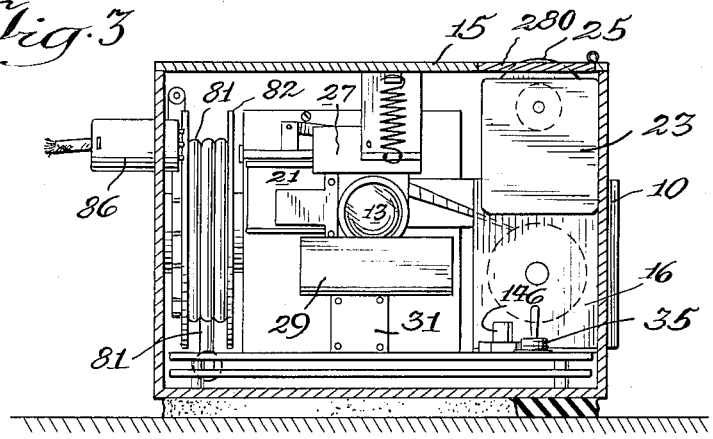
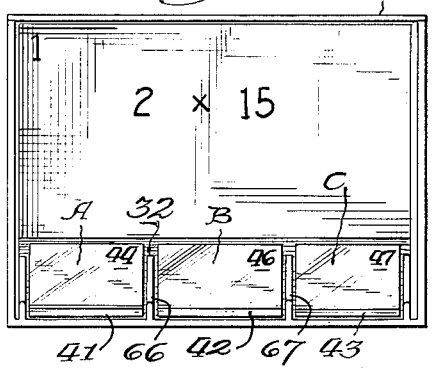
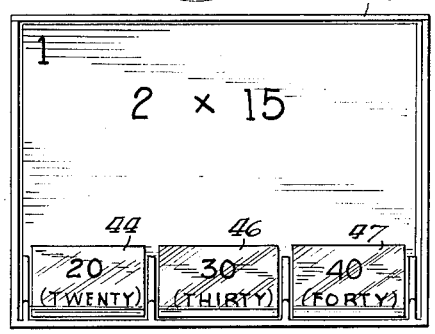
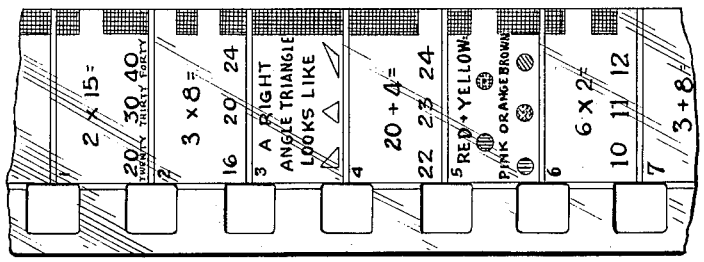

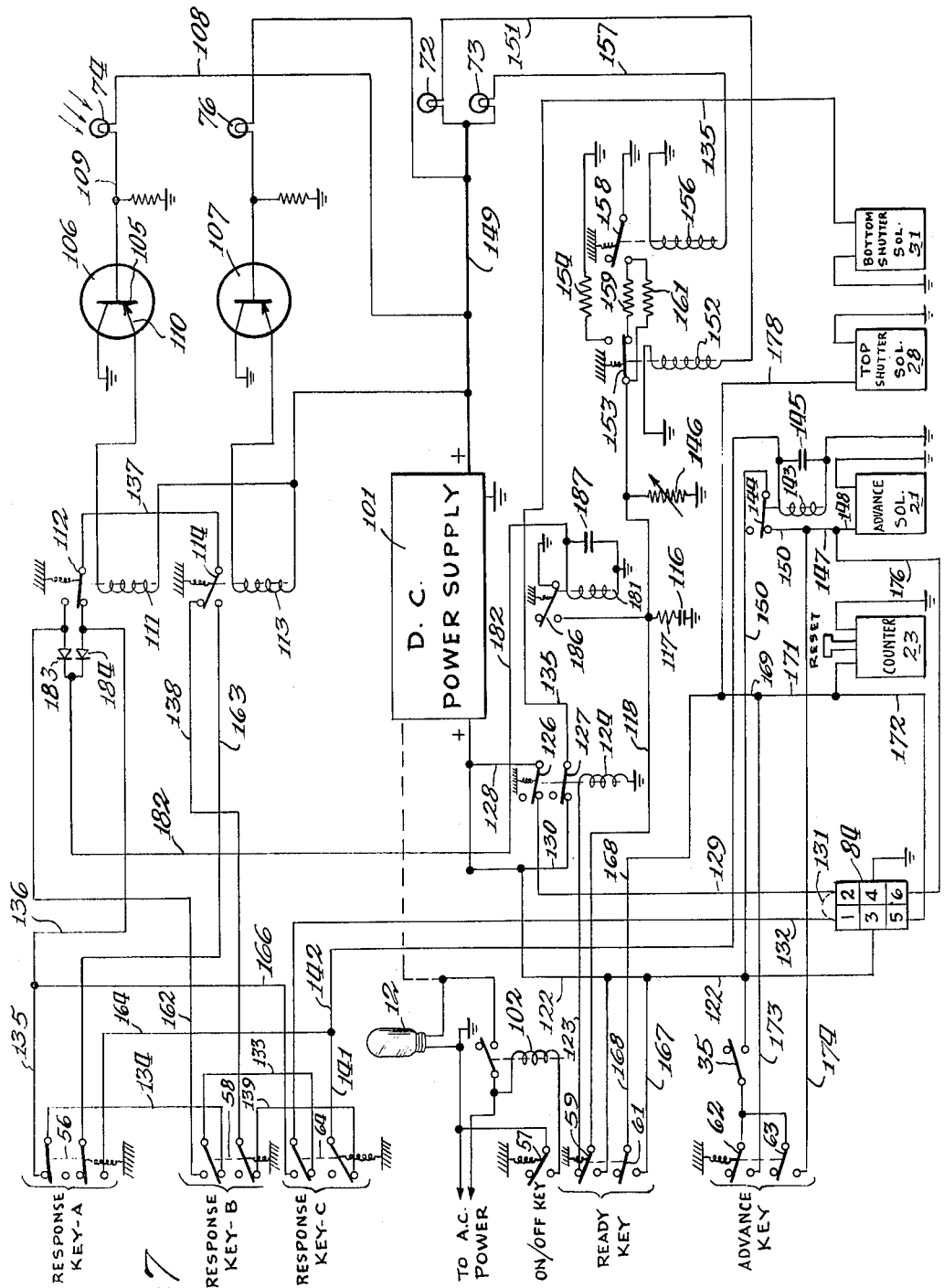

3,252,229
TEACHING MACHINE
Marshall Van Ostrom, 713 S. 56th St., Omaha, Nebr.
Filed Sept. 4, 1963, Ser. No. 306,479
8 Claims. (Cl. 35—9)

This invention relates to teaching machines. More particularly, it relates to a teaching machine of the "constructed response" type which is fully automatic and does not require the assistance of the student in determining whether a correct response has been made.

The rapid increase in population in recent years coupled with the increasingly rapid generation of new knowledge have caused attention to be turned to the use of teaching machines as a possible solution to the continuing shortage of qualified teachers. Teaching machines are mechanisms that present a course of instruction or program to a student in a predetermined manner which eliminates the need for a live teacher and also enables the student to progress at a rate in accordance with his own learning ability rather than at the average rate of a group of students.

Teaching machines fall into two general categories—"multiple choice" machines and "constructed response" machines. In the "multiple choice" type, the machine presents a stimulus, e.g., a question, and simultaneously presents a limited number of possible answers among which the student must choose the answer he believes to be correct.

It will be seen that in the "multiple choice" type of machine the student's choice is limited to the number of possible answers which the machine is capable of presenting. On the one hand, a small number of possible choice serves to limit the size and complexity of the machine, but ot the same time, permits guessing or blind choices which do not accurately measure the student's comprehension of the subject matter. "Multiple choice" machines, however, are easily adaptable to completely automatic operation, including automatic scoring and advancement to a new stimulus. Since the student typically indicates his choice by pressing a key or moving a lever, suitable electrical control circuits can be adapted to count the correct responses when the proper key or switch is manipulated and to cause the machine to proceed to the next stimulus.

"Constructed response" machines, on the other hand, are those which do not give to the student any assistance in choosing the correct answer to the given stimulus. The student is entirely free to and is in fact forced to "construct a response" with no predetermined limits on the scope of his answer. Typically, a "constructed response" type of machine requires a written, colored, or graphic answer by the student, the correctness of which cannot be automatically determined by the machine itself in the present state of development of teaching machine technology. Use of the machine requires that the student himself compare his answer with that indicated by the machine to be correct if the result is to be indicated immediately. It is obvious that this type of machine is not readily adaptable to automatic scoring or automatic progression to new material except with the cooperation of the student.

A flexible, self-contained teaching machine should ideally contain at least the following functions: a display unit to present the subject-matter information or stimulus; a response unit which receives the word, number, color, or graphic response made by the student in answer to the stimulus; a comparator unit to compare and judge the correctness of the student's response with the correct answer stored in the machine; a feedback feature whereby the correctness or incorrectness of the response is indicated immediately by a manifestation observable by the student, such as automatic progression to the next stimulus, in order to maintain the student's interest in the program and reinforce his desire to continue; a recorder unit to record the number of correct and incorrect responses given by the student as a measure of his performance; and a selector function to present the next stimulus in the predetermined program from a library stored within the machine. All of these functions are performed by the machine of the invention.

In accordance with the present invention, there is provided a teaching machine of the "constructed response" type, in which the student, after receiving the stimulus, is forced to construct a word, number, color or graphic response without any indication whatsoever of possible answers. At the same time, however, the machine requires no writing, coloring, or graphic reproduction on the part of the student in order to receive, record, and automatically score the student's response.

In brief, the machine of the invention achieves these results by presenting a stimulus (e.g., a question) to the student with no indication of any possible answers among which the correct answer is to be found. The student, therefore, is forced to construct mentally or covertly a word, number, color, or graphic response to the stimulus without any outside assistance. After the student's answer is covertly constructed, he operates a control on the machine to display a number of possible word, number, color, or graphic answers, from among which the correct answer is to be recognized by the student as being the one which he has previously covertly constructed. The time within which the correct answer must be recorded, however, is limited to a very short machine-controlled interval, usually on the order of one to eight seconds, thereby giving the student sufficient time only to scan the possible answers and to recognize the one which agrees with his previously covertly constructed response. It is impossible, for example, within the allowed time for the student to consider in turn each of the possible answers and to arrive at the correct answer by a process of elimination. The machine of the invention further immediately records the student's response as correct or incorrect and, provided a correct response has been made, reinforces the student by progressing automatically to the next stimulus in accordance with the pre-arranged program.

The invention will be better understood from the following detailed description thereof taken in conjunction with the accompanying drawings, in which:

FIGURE 1 is a top view of a typical embodiment of the invention with the top of the case opened, showing also a portion of the top and an optional shutter mechanism attached to the underside thereof;

FIGURE 2 is a side sectional view of the invention along the line 2—2 of FIGURE 1, showing the projection mechanism and the lower and optional upper shutters used to interrupt the beam projected to the front screen;

FIGURE 3 is a front sectional view along the line 3—3 of FIGURE 1 showing a front view of the projector and a cartridge containing the program material in place;

FIGURE 4 is a front view of the entire machine showing a typical stimulus and the absence of any suggested answers;

FIGURE 5 is an additional front view of the machine showing a typical choice of answers available to the student for the short time during which he must recognize and register his response;

FIGURE 6 is an enlarged view of a section of photographic film, typically 8-mm., on which a typical program is stored, showing the stimuli on consecutive frames thereof and also a code of light and dark squares along the edge opposite the sprocket holes which is used to activate the proper response keys and to control the allowed time interval for responding; and FIGURE 7 is a schematic wiring diagram of a typical embodiment of the invention.

As shown in FIGURE 1, in a typical embodiment the invention comprises a housing 10 enclosing the working parts of the machine which comprise a film strip projector 11 including a light source 12, a lens systems 13, and a film gate 14. The film which is projected is contained in a removable cartridge 16, which is inserted into and removed from the machine through a suitable slot 17 in the side of housing 10. The film within the cartridge 16 is wound as an endless coil 18 and passes through a vertical film guide 19 which cooperates with the film gate 14 to hold the film in vertical position for projection. Cartridge 16, which in itself does not form a part of the present invention, is described and claimed in my copending application, Serial No. 278,934 filed May 8, 1963.

Film advance 21 of any suitable design typically comprises a claw 22 which on the activation of the advance mechanism serves to advance the film one frame.

The machine is further provided with an automatic counter 23 which advances one unit every time "Ready" key 42 (see below) is depressed. The total count shown by the counter can be read through opening 24 in top 15 and is used in calculating the student's errors, as will hereafter be explained in detail. Knurled reset wheel 25 permits resetting the count to zero at the beginning of a program, but operates only in the forward direction, i.e., the reading cannot be decreased by reverse operation of the wheel. Thus, a student cannot cheat by operating the reset wheel to decrease the number of errors in his score. The reset wheel along with the other control and adjustment switches can all be made inaccessible to the student when the instructor elects to lock the control and adjustment access panel 280.

The individual film frame in position within the projector is projected onto the back of a suitable translucent (e.g., glass) screen 26, so that the stimulus is visible from the front of the machine (i.e., the left end of FIGURE 1) as shown in FIGURES 4 and 5. The path of the beam between the projector 11 and screen 26 is interruptible by optional top shutter 27 attached to the underside of the top 15 of the housing and controlled by spring 20 and solenoid 28, as well as by lower shutter 29 controlled by spring 30 and solenoid 31. In the position shown in FIGURE 2 (i.e., with solenoid 28 deactivated), shutter 27 obstructs the upper part of the beam projected by projector 11. When solenoid 28 is activated, shutter 27 moves to the position shown by the dashed line, permitting the upper portion of the projected beam to reach screen 26. Unless solenoid 31 is also independently activated in a manner to be described to depress lower shutter 29, however, the lower portion of the projected beam is obstructed to produce a dark zone 32 in the display on screen 26, as shown in FIGURE 4.

Arranged below the screen 26 are a number of operating keys, viz., three horizontal mode keys, 41, 42, and 43, labeled "On/Off," "Ready," and "Advance," and three vertical response keys, 44, 46, and 47 (labeled A, B, and C in FIGURE 4). The response keys are preferably constructed of transparent plastic material in order to avoid obstructing the possible responses which are projected onto screen 26. Each of the mode keys and the response keys is hinged about a horizontal longitudinal axis near one end of the key and each has rigidly attached thereto a horizontal extension (i.e., 48, 49, and 51 on the mode keys and 52, 53, and 54 on the response keys) which, on movement downwardly of the mode keys or inwardly of the response keys, rises or falls to activate one or more momentary contact switches (i.e., 56, 57, 58, 59, 61, 62, 63, and 64) associated therewith.

The individual horizontal mode keys and vertical response keys are separated by means of separators, e.g., 66 and 67, which extend beyond the surface of the keys and thus prevent accidental simultaneous activation of two adjacent keys by the student.

Located between the screen 26 and projector 11 and close to one side of housing 10 is support 71 carrying four photocells 72, 73, 74, and 76 evenly spaced along its length and in position to cooperate with the film code as shown in FIGURE 6 to activate the proper response key and control the response time. Two of the photocells, i.e., 74 and 76, control the selection of one of response keys 44, 46, or 47 depending on the combination of photocells which is activated. The two remaining photocells, i.e., 72 and 73, affect the time period allowed for the student to make his response. In each case, a given photocell is activated if the code of light and dark areas along the edge of the film (FIGURE 6) permits light to strike the photocell. In the event that the code on the film contains a dark area, the corresponding photocell will, of course, have no light impinging thereon and will not be activated. By suitably arranging the light and dark areas in the code, therefore, one or more of the response keys can be made to correspond to the correct answer or answers by means of a suitable control system. In addition, the time interval allowed for response can be changed, e.g., to increase the time when the answer is complex. The operation of this control system used in conjunction with the photocells will be described in greater detail below.

Also shown in FIGURE 1 are power cord 81 wound on a spring loaded storage reel 82, a carrying handle 83, and a jack 84 and mating external plug 86 for electrical interconnection of the teaching machine, if desired, to associated equipment such as a tape recorder.

The operation of the teaching machine is as follows. Having inserted a suitable cartridge 16 containing the programmed and coded material and connected the power cord to a suitable power outlet, the student depresses the "On/Off" key to 41 to energize the projector 11, thereby projecting a stimulus onto screen 26 which can be read from the front of the machine. (In this discussion top shutter 27, which is an optional feature of the machine, will be considered as being absent. The operation of this shutter will be described in detail below.) With the components of the machine in the positions shown in FIGURE 2, a student might observe on the ground glass screen 26 a stimulus such as that shown in FIGURE 4, which asks for the product of the given multiplication. It should be observed that FIGURE 4 presents no choice of possible answers so that the student is forced to construct what he considers the proper response in his own mind without guessing or going through a process of eliminating possible answers, since he does not know in advance the possible answers among which he will be required to respond. When the student believes that he knows the correct answer, he depresses the "Ready" key 42, the effect of which is to energize solenoid 31, causing shutter 29 to be withdrawn from the light beam, thereby eliminating the lower previously darkened portion 32 on screen 26 and causing the appearance on the screen of the three possible answers shown in FIGURE 5. Each possible answer appears behind one of the vertical response keys 44, 46 and 47. The presentation of possible answers lasts for only the amount of time, as determined by the programmer, required for the student to recognize his previously covertly constructed response, usually ranging from one to eight seconds or more, during which time the student must press one of the response keys to indicate his response. The very short time interval during which the response keys are active is insufficient to give the student time to make an educated guess that any given answer may be correct; rather, he has time only to recognize among the possibilities the answer he had previously constructed in the absence of any possible choices. If the student presses the response key corresponding to the right answer, he is immediately rewarded by seeing the stimulus change as the film advance mechanism projects the next frame from the film strip in the cartridge. In the event the student responds incorrectly, however, or if no response is made during the allowed interval, the observed stimulus is not changed and remains until the sequence is repeated, starting with the "Ready" key, and the proper response key is pressed, or the "Advance" mode key is pressed.

FIGURE 6 depicts a section of a typical film program and shows the coding of light and dark squares running along the upper edge of the film which is used to control both the time interval allowed for response and the selection of the response key corresponding to the correct answer. It will be seen that a narrow band running along the width of each frame is divided into four approximately square sections, each of which may be light (i.e., clear) or dark. Two adjacent sections are used to select the correct response key in accordance with whether or not light passing therethrough reaches suitably positioned photoelectric cells, e.g., 74 and 76 (FIGURE 2). The remaining two code sections similarly select whether a longer or shorter period of time will be allowed for response to a given stimulus (as, for example, when a question calls for a response comprising two words or numbers rather than one, a series of colors, or a complex graphic representation).

Automatic scoring in a program is provided in the following manner. The electrical operating circuit of the machine is so constructed that counter 23 advances one unit every time the "Ready" key 42 is depressed. In addition, the frames in the film program are numbered consecutively in the upper left-hand corner (see FIGURES 4, 5 and 6). Every time a correct response is made, the film advance 21 is activated to advance the film by one frame. At the beginning of the film program, frame No. 0 is put into viewing position and counter 23 is correspondingly set to read zero by means of reset wheel 25. When the student presses the "Ready" key to expose the possible answers, counter 23 advances by one unit to indicate "1." If during the period for response the student correctly answers the question, the film advance mechanism is activated to display the next frame of the program, marked "1." If, on the other hand, a wrong answer is made, the film does not advance and frame No. 0 remains visible. In order to answer the question correctly and thus to advance the film, the student must again depress the "Ready" key, thereby advancing the counter to "2." It will therefore be seen that counter 23 indicates the total number of times an answer has been attempted, while the number of the frame displayed on screen 26 corresponds to the number of correct responses (since no correct answer is required in order to display the first or "0" frame). The number of incorrect responses can thus readily be calculated by subtracting the frame number from the counter number.

"Advance" mode key 43 is so arranged that, when it is depressed, both the frame number and the counter reading advance by one unit. This key is useful for positioning the film strip properly at the beginning of a program, or for displaying, by-passing or omitting portions of the program as desired. It will be seen, however, that operation of the "Advance" key cannot be distinguished from the student's giving of a correct answer, without actually doing so. If the teacher, therefore, desires to force the student to respond to every question and eliminate the ability to bypass some of them by means of the "Advance" key, switch 35 within the machine, which is reached through the lockable access panel 280 (FIGURE 1), can be thrown to the "Off" position, thereby deactivating the "Advance" key and making it impossible to advance the film strip without giving a correct response to the question.

The wiring diagram of a specific embodiment of the invention is shown in FIGURE 7, suitable variations of which will be apparent to those skilled in the art. A D.C. power supply 101, indicated schematically, is energized when "On/Off" mode key is depressed to close momentary contact switch 57 and activate impulse relay 102, which locks in the activated position until the "On/Off" key is again depressed to de-energize the equipment. Projection lamp is also energized when the equipment is turned on to project the film frame in the projector onto screen 26.

Photocells 74 and 76 are employed in a control network including transistors 106 and 107 to select which one of response keys A, B, or C corresponds to the "correct" response. Photocells 74 and 76 act like switches which are open except when light falls thereon, when they close to complete the circuit therethough. In the following discussion it will be assumed that the code on the film frame being projected is such that light strikes photocell 74 and no light strikes photocell 76. In the embodiment shown in FIGURE 7, this light code causes the selection of response key A as the correct response.

With photocell 74 in a conducting condition because of the light striking it, the circuit is completed from the power supply 101 through bus 149 and conductors 108 and 109 to the base 105 of transistor 106, causing current to flow through emitter 110 thereof and thereby activating solenoid 111 to hold spring loaded switch 112 in the position shown. Since no light falls on photocell 76, however, transistor 107 is de-energized; no current flows through relay coil 113 so that switch 114 controlled by this relay is in the position shown.

The student initiates a cycle of operation by depressing "Ready" key 42 for a period (e.g., approximately one second) sufficient to charge capacitor 116 through resistor 117, conductor 118, momentary contact switch 59, and bus 122. When "Ready" key is released, switch 59 returns to the position shown in FIGURE 7, thus permitting capacitor 116 to discharge through conductor 118, switch 59, conductor 123, and relay coil 124, causing relay switches 126 and 127 to close. The closing of switch 126 connects power supply 101 to the right side of the upper section of switch 56 (activated by response key A) through conductors 128, 129, jumper conductor 131 (used when no external circuit is connected to terminals 1 and 2 of jack 84), conductor 132, the upper section of switch 64 (response key C) in the position shown, conductor 133, the upper section of switch 58 (response key B) in the position shown, and conductor 134.

During the discharge of capacitor 116 through relay coil 124, power is also supplied from bus 122 through conductor 130, closed switch 127, and conductor 135 to bottom shutter solenoid 31 which depresses shutter 29 (FIGURE 3) to expose the possible answers on screen 26. When the discharge current from capacitor 116 falls to a value too low to energize relay coil 124, switches 126 and 127 open, removing power from all of the response keys (thus preventing any response) and at the same time permitting bottom shutter 29 to rise and again obstruct the display of possible answers.

Switch 56 is activated by response key A, which is designated as the "correct" response by the code on the film frame which causes light to fall on the photocell 74 but not photocell 76. In FIGURE 7, switch 56 is shown in the position it assumes momentarily during the time that response key A is depressed by a student who has made the proper selection. The power which appears at the right side of the upper section of switch 56 on the closing of switch 126 thus becomes available through switch 56, conductor 135, and conductor 136, and appears at switch 112 which is in the position shown because relay 111 is activated, as previously explained. The circuit is completed to ground through conductor 137, switch 114 in the position shown, conductor 138, the lower section of switch 58 in the position shown, conductor 139, the lower section of switch 64 in the position shown, conductor 141, conductor 142, and relay 143 which becomes energized, causing relay switch 144 to close as shown, thus supplying power to the advance solenoid 21 from bus conductor 122, conductor 150, conductor 147, and conductor 148. Solenoid 21 accordingly steps and advances the film program by one frame.

Capacitor 145 is supplied in parallel across relay 143 to insure activation of this relay for a sufficient period to cause the advance solenoid to operate, as will be apparent to those skilled in the art.

It will be seen that during the time capacitor 116 is discharging through resistance 117 and relay coil 124, it is also in parallel with variable resistance 146, adjustment of which will vary the total discharge time of capacitor 116 and therefore the time during which relay 124 is activated to permit the appearance of power at response key A for selection of the proper answer. The values of capacitance and resistance in the circuit including capacitor 116 should, therefore, be chosen of such a size to cause the energization of relay coil 124 for a period on the order of one to eight or more seconds, the total period being variable over a range by means of resistor 146 in order to adjust, if necessary, the recognition time required for the response to the individual reading speed of the student or to compensate for any timing variations occasioned by the aging of the components.

Photocells 72 and 73 are similar to photocells 74 and 76, being conductive when energized by light. These photocells also operate in conjunction with the code of light and dark areas on the edge of a film frame, as in the case of photocells 74 and 76. By means of photocell 72, relay coil 152 can be activated (via bus 149 and conductor 151) or deactivated to operate switch 153 and thus to introduce or to remove resistor 154 from its parallel connection with capacitor 116. Accordingly, the total time required for capacitor 116 to discharge can be further modified as desired in any particular case by activating or deactivating photocell 72 by means of the appropriate code on the program film. In a similar manner, photocell 73 can be used to energize relay coil 156 through conductor 157 to close relay switch 158 and thus insert one or both of resistors 159 and 161 in the circuit in parallel with capacitor 116, further affecting the total allowed response time in any desired manner. Suitable values of these resistors and appropriate arrangements of the light codes to be used on the film for activating photocells 72 and 73 will be apparent to those skilled in the art.

In the discussion above, it has been assumed that photocell 74 was energized, requiring that response key A be activated in order to signify a correct answer. In order to designate response key B as corresponding to a correct answer, the code on the program film should be adjusted so that light strikes photocell 76 but not photocell 74. Under these circumstances, switches 112 and 114 will reverse positions from those shown in FIGURE 7. One skilled in the art will then be able to trace the appearance of power (after the "Ready" key has been depressed, as previously described) at the right-hand side of the upper section of switch 58, which when pressed by the student causes power to be available through conductor 162, the upper contact of switch 112, conductor 137, the lower contact of switch 114, conductor 163, the lower section of switch 56 (response key A being in the opposite position to that shown in FIGURE 7), conductor 164 to conductor 142 and so on as previously explained, thereby causing the activation of advance solenoid 21.

When light strikes both photocells 74 and 76, response key C is designated as the correct answer. In this case, power appears through conductor 132 to the upper section of switch 64, thence through conductor 166, conductor 136, the lower contact of switch 112, conductor 137, the lower contact of the switch 114, conductor 163, the lower section of switch 56, conductor 164, and conductor 142 to relay 143 as before.

It will be seen, therefore, that the code used on the film frames permits the selection of any of the three response keys as the correct answer. This system of control can be enlarged, if desired, for use in a teaching machine providing four or even more response possibilities for the correct answer. For example, the condition in which neither photocell 74 nor photocell 76 receives light is not used in the present case, but could be employed to select a fourth response key as that corresponding to the correct answer. In a similar manner, addition of other photocells permits other combinations to be worked out for selecting any of the possible responses as the correct answer. This same method can also be used to further modify the time for response to a particular stimulus, by means of additional photocells such as 72 and 73 and relays such as 152 and 156 to insert or remove additional values of resistance, thereby affecting the time within which capacitor 16 discharges and therefore the time within which a response can be recorded.

It will be seen from FIGURE 7 that every time the "Ready" key is depressed to start the allowed answer period, switch 61 closes, thus supplying power from bus 122 through conductors 167, 168, 169, and 171 to counter 23 which advances by one unit. By means of conductor 172, the same power pulse is available at jack 84 for use in an external circuit if desired.

Switch 35 (FIGURE 7) controls the operation of the "Advance" key. When switch 35 is closed, power is available at switches 62 and 63 from bus 122. When the "Advance" key is depressed, switch 62 supplies power through conductor 173 and conductor 171 to counter 23, which advances one unit. Simultaneously, power is supplied through switch 63, conductor 174, conductor 147, and conductor 148 to advance solenoid 21, causing the film program to advance by one frame. The power pulse supplied to the advance solenoid in this manner is also available at pin 6 of jack 84 through conductor 176.

In order for capacitor 116 to charge sufficiently to activate relay 124 for a sufficient period, it is typically necessary that the "Ready" key activating switch 59 remain depressed for approximately one second, rather than momentarily. To insure that the "Ready" key is depressed for a sufficiently long period, optional top shutter 27 and solenoid 28 may be provided, to be operated in conjunction with switch 61 ("Ready" key). In its normal unactivated condition, top shutter solenoid 28 permits top shutter 27 (see FIGURE 2) to completely obstruct the projected stimulus (but not the possible answers). In order to cause the appearance of the stimulus, the "Ready" key is depressed and maintained in a depressed condition, thereby activating top shutter solenoid 28 from bus 122 through conductor 167, switch 61, conductor 168, and conductor 178. Since the "Ready" key must be maintained in a depressed condition as long as it is necessary to read and understand the question, usually more than one second, operation with the top shutter installed insures that capacitor 116 is entirely charged. When the "Ready" key is released, top shutter solenoid 28 is again deactivated, causing the obstruction of the stimulus and the appearance of the possible answers as described above.

In addition to indicating a correct response, the machine of the invention is also equipped to detect and record an incorrect response and thereafter to prevent any further attempt at an answer without repeating the entire answering cycle starting with the "Ready" key. Thus, if an incorrect response key is actuated by the student, the timing cycle immediately ends, thereby ending the period in which the response keys are energized.

The timing cycle is terminated, when an incorrect response is given by the student, by means of relay coil 181 which is activated through conductor 182 and one of rectifiers 183 and 184. As an example of the operation of the machine when an incorrect response key is actuated, assume that the machine is in a condition such that the correct response is given by key A, as shown in FIGURE 7. Assume further that response key B is actuated by the student. As previously explained, under these conditions power from power supply 101 is available at the common terminal of the upper section of switch 58 (key B) through conductor 133. When response key B is actuated, this power becomes available through conductor 162 to the right-hand side of rectifier 183 and as a result current passes through rectifier 183, conductor 182, and relay coil 181 to ground, activating the relay and causing momentary contact switch 186 to close and thereby to short timing capacitor 116 to ground through resistor 117. Capacitor 187, in parallel with relay coil 181, is used to insure that the activation of relay coil 181 will continue for a sufficient period of time to discharge capacitor 116. When capacitor 116 is discharged, relay coil 124 is de-energized, causing switches 126 and 127 to open, and thereby deactivating response keys A, B, and C. In order to reactivate the response keys, it is necessary to depress the "Ready" key (advancing counter 23) as previously described.

It will be seen that when response key A is actuated to indicate a correct response, power is applied through conductors 135 and 136 to the right side of rectifier 184, corresponding to rectifier 183 used in conjunction with response key B. The circuit leading away from rectifier 184 through switch 112 actuates advance solenoid 21 to advance the film when power is applied in order to indicate a correct answer, as previously described. On the application of power, however, the circuit leading from conductor 136 to conductor 182 through rectifier 184 would normally cause relay coil 181 to actuate switch 186 and thereby end the timing period. In order to prevent the discharge of timing capacitor 116 and the consequent disappearance of power required for operating advance solenoid 21 to indicate a correct response, it is preferred that relay 181 should have a relatively slow action, i.e., the time required for relay coil 181 to close switch 186 should be substantially longer than the time required for relay coil 143 to close switch 144. In this way, advance solenoid 21 will be activated before power is withdrawn, thus preventing a spurious indication of a wrong answer.

Rectifiers 183 and 184 are necessary in order to prevent improper activation of advance solenoid 21 when a response key other than the correct one is actuated. It will be noted that in the absence of these rectifiers, if a power pulse were applied through conductor 162 on the actuation of response key B (an incorrect response under the conditions of FIGURE 7), the circuit could be completed through the conductors connected to rectifiers 183 and 184 and through switch 112 to cause the activation of advance solenoid 21. To prevent such a result, rectifier 184 is used to block current flow through switch 112, whereas rectifier 183 permits the activation of relay 181 and the consequent end of the timing cycle. In a similar manner, rectifier 183 would prevent the indication of a correct response if a power pulse were applied to rectifier 184 under a condition in which switch 112 contacts its upper terminal, e.g., when the correct response is provided by actuation of response key B.

The foregoing detailed description has been given for clearness of understanding only, and no unnecessary limitations should be understood therefrom, as modifications will be obvious to those skilled in the art.

What is claimed is:

1. In a teaching machine, the combination of first display means to display to a student using the machine a stimulus requiring the student to construct a response thereto, said first display means including an image projector for projecting a stimulus and a screen for receiving the projected stimulus; second display means adapted to be activated by the student to cause the additional display by said machine of a plurality of responses to said stimulus, including a correct response, said second display means comprising a shutter interposed between said screen and said projector, said shutter being movable between a first position in which said shutter obstructs a portion of the beam projected by said projector and a second position in which the beam is not obstructed; timing means for controlling automatically the display time for which said display of responses continues after being activated by the student; timing adjustment means for varying the display time controlled by said timing means; a plurality of response means of which one is associated with each of said responses displayed by the machine, each of said response means being in an active condition only during the display time of said responses, actuation by the student of any active response means indicating his recognition and recording of the response corresponding to said actuated response means as the correct response; comparator means for determining the correctness of an answer recorded by the student; advancing means for displaying a new stimulus activated by a correct response to the displayed stimulus; and recording means for recording the number of correct and incorrect responses made by the student.

2. A teaching machine in accordance with claim 1 wherein said timing means comprises a control circuit including a photocell which can be activated by said beam to vary the display time of said responses in accordance with the complexity of the desired response.

3. A teaching machine in accordance with claim 1 in which said comparator means comprises a circuit including a photocell which when activated by said light beam operates to select a given one of said response means as the correct response, recognition and actuation of said correct response means by the student resulting in a reinforcing manifestation observable by the student.

4. In a teaching machine, the combination of first display means for displaying to a student using the machine a stimulus requiring the student to construct a response thereto, said first display means comprising an image projector, a length of photographic film containing said stimulus for projection by said projector, and a screen for receiving the projected image of said stimulus; second display means for displaying a plurality of responses to said stimulus, said second display means comprising said image projector, said photographic film, said screen and shutter means for selectively blocking the display of said responses; timing means adapted to be actuated by the student for automatically limiting the display of said responses to a predetermined period of time long enough for the student to recognize thereamong his previously constructed response to the stimulus but insufficient to enable the student to consider and judge the correctness of each response individually; a plurality of response means of which one is associated with each of said responses; activating means for activating said response means only during the display time of said responses, actuation by the student of any active response means during said display time thereby indicating his recognition of the response corresponding thereto as the correct response; comparator means for determining the correctness of a response recorded by the student, said comparator means including advancing means for said photographic film, said advancing means being activated by a correct response to change the projected stimulus; and recording means for recording the number of correct and incorrect responses made by the student.

5. A teaching machine in accordance with claim 4 in which said timing means controls the display time of said possible responses to a predetermined period within the range of about one to eight seconds.

6. A teaching machine in accordance with claim 4 in which said timing means comprises at least one photocell adapted to be activated by a portion of the light beam projected by said projector, said photocell being selectively activated by light controlled by said film to alter the display time of said responses in accordance with the complexity thereof.

7. A teaching machine in accordance with claim 4 in which said comparator means comprises at least one photocell adapted to be activated by a portion of the light beam projected by said projector, said photocell being selectively activated by light controlled by said film to select the response means corresponding to the correct response.

8. A teaching machine in accordance with claim 7 in which said film is coded to control the light falling on said photocell to select the response means corresponding to the correct response.

References Cited by the Examiner

UNITED STATES PATENTS

| | | | |
|---|---|---|---|
| Re. 23,030 | 8/1948 | Holt | 35—9 |
| 3,052,041 | 9/1962 | Luxton | 35—9 |
| 3,075,303 | 1/1963 | Butterly | 35—35.3 |
| 3,077,038 | 2/1963 | Williams et al. | 35—9 |
| 3,100,351 | 8/1963 | Priednieks et al. | 35—9 X |
| 3,117,382 | 1/1964 | Schutzberger et al. | 35—9 |
| 3,137,948 | 6/1964 | Wyckoff | 35—9 |

EUGENE R. CAPOZIO, *Primary Examiner.*

LAWRENCE CHARLES, *Examiner.*

S. M. BENDER, *Assistant Examiner.*